July 28, 1970 R. V. JUDY 3,522,386

LINEFINDER CIRCUIT RESPONSIVE ONLY TO FULL PULSES

Filed April 26, 1967

INVENTOR
R.V. JUDY
BY
D.G. Warner
ATTORNEY

United States Patent Office 3,522,386
Patented July 28, 1970

1 2

3,522,386

LINEFINDER CIRCUIT RESPONSIVE ONLY TO FULL PULSES

Robert V. Judy, Chicago, Ill., assignor to International Telephone and Telegraph Corp., New York., N.Y., a corporation of Maryland Filed Apr. 26, 1967, Ser. No. 633,739
Int. Cl. H04q 3/26
U.S. Cl. 179—18 8 Claims

ABSTRACT OF THE DISCLOSURE

A linefinder is provided to operate from a common pulse generator. If a demand-for-service signal is received at the same time a dial pulse is being received, a differential relay will be operated to prevent the further application of the dial pulse, which may be of too short duration to operate stepping switches. Operation of the differential relay will also close appropriate sets of contact points so that the next dial pulse, which will then be a full pulse, will be made available to operate the stepping switches. Erroneous results from attempts to operate step-by-step telephone circuits using poorly shaped pulses are prevented by the common generator and errors due to poor timing of the first pulse are eliminated by use of the differential relay.

Figures 1, 2, 3:
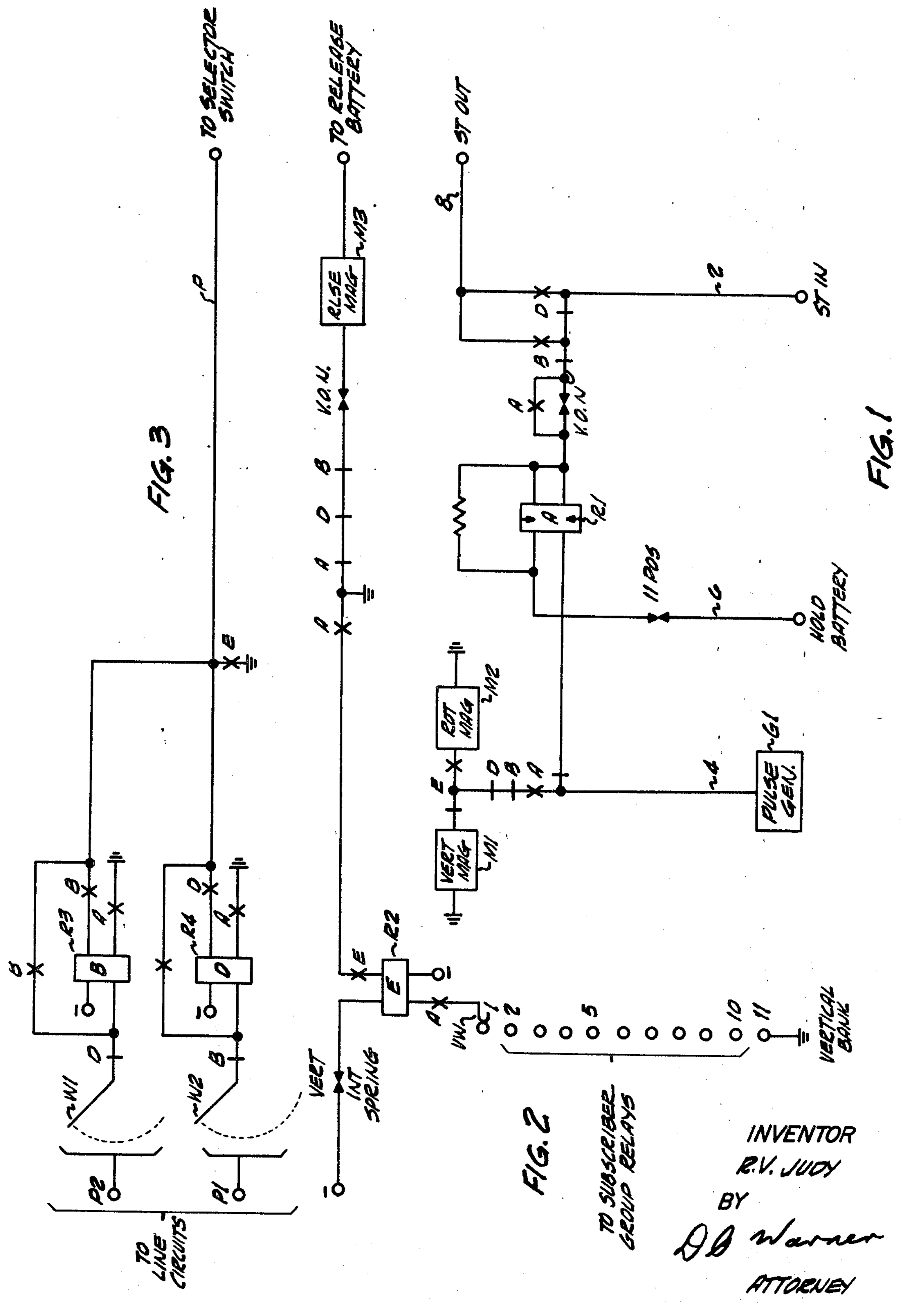

This invention relates to switches for concentrating traffic in telephone systems and particularly to improve linefinder circuits.

A step-by-step telephone system includes switches for both concentrating and expanding traffic. Certain of these switches for concentrating traffic, called "linefinders," are interposed between subscriber lines and selector switches. The function of a linefinder may be said to be to seek out a subscribed line having a "mark," usually ground potential, thereon indicative of an off-hook or calling condition.

Conventionally, a linefinder starts operation when a calling signal is applied to a start lead. Thereafter, the linefinder automatically steps to find a marked set of level and line terminals. Frequently, the stepping pulses available are distorted so badly that it is impossible to step the switches without special circuit design. Accordingly, in conventional linefinder circuits, switches are stepped responsive to an interaction of relays called "lock pulse" or "hunt assist" relays, in the linefinder's individual circuit. A conventional linefinder designed for operation in this manner has six or more relays in its individual circuit.

It is an object of this invention to eliminate the need for a lock pulse or hunt assist relay combination in linefinder circuits and to provide improved and simplified linefinders.

The foregoing objects and others ancillary thereto are accomplished by embodiments of the present invention operating in a telephone office having a common pulse generator which generates a continuous train of dial pulses. The linefinder circuit includes means for assuring that the output of the pulse generator will be applied to selected ones of the stepping magnets of the linefinder in a suitable way to drive them in search of the marked level and line terminals.

In order to operate electromagnetic switching equipment successfully, and especially step-by-step switches, a pulse generator must provide stepping pulses having a 40% make to 60% break ratio at a given pulse repetition rate. If the volt-second content of the make pulse is reduced significantly below the 40% amount, the electromechanical switches may not operate reliably. A problem associated with the use of a common pulse generator is that of synchronizing the pulses with signals calling for service. If a call for service signal is received in an interval between stepping pulses, the first pulse will be a full one, the stepping equipment will function properly and there will be no problem. Frequently, however, the first pulse will be clipped because it is already partially completed when the call for service is made and it is applied to a stepping magnet. As a result, the first drive pulse may be applied to a magnet winding after the 40% make period has begun. To prevent the application of such a shortened drive pulse to the magnet winding of a stepping switch, embodiments of the invention use the first pulse (if it is being received at the time the signal calling for service is received) to differentially energize, and thereby delay complete operation of a differential relay (relay A in the disclosure) until the first pulse is terminated. The vertical magnet is connected through contacts controlled by the A relay so it can take a first step only after termination of a first pulse which corresponds to the time when the relay A is no longer differentially energized. After completion of vertical motion, the changeover to rotary motion is made via a circuit extended through vertical magnet interrupter contacts which close only after termination of a pulse.

The novel features of this invention are set out in the claims. The invention will be better understood by consideration of the attached drawings, in which FIG.. 1 is a diagram showing input circuits and control elements of a preferred embodiment of a linefinder constructed in accordance with the invention, and FIGS. 2 and 3 depict additional control elements as well as controlled elements of a preferred embodiment of the linefinder.

The figures taken together show four relays which are labeled A, B, D, and E. A differential relay A (or R1) serves as a start relay, or demand relay, which is provided to select the time when the output of the pulse generator G1 will be applied to the vertical magnet M1. Energization of the magnet M1 starts the linefinder circuit operation. Cut-through relays B and D are provided for sleeve control; B for the first hundred lines and D for the second hundred lines. The transfer relay E is used to change over a pulsing circuit from driving the switch in a vertical direction to driving it in a rotary direction.

The vertical magnet M1 or "VERT MAG" drives the switch in a vertical direction. The rotary magnet M2 or "ROT MAG" drives it in a rotary direction. The release magnet M3 or "RLSE MAG" returns it to a normal position upon release.

The linefinder level identifies the tens group of a calling subscriber station from a ground marking in the "VERTICAL BANK." Thus, if the calling subscriber is, for example, in the fifth tens group, only the fifth level of the tens group in the linefinder is marked by ground. The marking is provided by subscriber group relays which form no part of this invention and are not illustrated. The eleventh level of the vertical bank is permanently marked by ground to stop linefinder motion if the switch drives itself into an overflow position.

The illustrated circuit operates as follows. A calling subscriber station goes off-hook. Connections are made between the subscriber line circuit central office (not shown), a terminal on the vertical bank, and a terminal on either the P1 bank, if the calling station is connected to the first hundred group, or the P2 bank, if the calling station is connected to the second hundred group. Shortly thereafter a demand is placed on the linefinder by a ground potential on the stator conductor 2 or "ST IN." If the start conductor 2 is marked at a time when the pulse generator is not supplying a pulse on the "PULSE" lead 4, there will be no problem because no pulse will be present on 4 to operate the lower winding of differential relay A and relay A will be operated over lines 2 and 6 through its upper winding to close its make contacts on line 4. Under these conditions, the vertical magnet M1 will receive the first full pulse.

If the ground demand appears on the start lead 2 at a time when a pulse is present on the pulse lead 4, there would ordinarily be a problem, because the duration of the first pulse could be fore-shortened so that less than the required 40–60% make-to-break ratio would be presented. To avoid shortening the first pulse in the event the start lead is marked while a pulse is being received over lead 4, the differential relay A (R1) is differentially energized over a circuit traceable from conductor 2, over break contacts of relays D and B, the V.O.N. spring, the upper and lower windings of relay A to the "PULSE" lead 4 and to the "HOLD" battery on line 6. When the first pulse terminates, the lower winding of differential relay A is de-energized and the relay is operated and held by the hold battery over line 6 and its upper winding. De-energization of the lower winding is maintained when the relay A opens a set of break contacts in series between its lower winding and line 4 so that it cannot thereafter be differentially energized. Relay A, upon being operated, also seizes a set of make contacts in the circuit leading to the vertical magnet, prepares operate and lock paths for the E relay and for the B and D relays, and opens the path of the release magnet M3. From the foregoing, it will be seen that the vertical magnet M1 will receive a full first pulse and cannot receive a fragment of a first pulse.

The pulses from the pulse generator G1 drive the vertical manget M1, and the switch steps upward in search of a marked level. When the vertical wiper (NW) reaches a marked terminal the left hand winding of relay E is connected to ground. After the termination of the input pulse, the vertical magnet releases and closes the vertical interrupter springs "VERT INT." Note that the relay E is operated only after the wiper reaches a grounded terminal and after termination of the input pulse. The operation of relay E opens a break contact opening in a circuit to the vertical magnet "VERT MAG" or M1 and closes a make contact to complete a circuit to a rotary magnet "ROT MAG" or M2. Thereafter, the output of the pulse generator drives the rotary magnet until the marked line terminal on the P1 and/or P2 wipers is reached and the appropriate relay D (R4) or B (R3) operates. Operation of either the D or B relay causes a break in the drive circuit through the opening of a break contact between the "PULSE" lead 4 and the rotary magnet "ROT MAG." The B or D relay, when operated, forms a series connection from the line circuit CO relay (not shown), over the line P1 or P2, the wiper contact W1 or W2, a break contact of the other relay, a make contact of the A relay and its own relay winding to operate the relay fully and provide a holding circuit.

From the last paragraph it will be noted that the described embodiment of the invention ties the changeover from vertical to rotary magnet to the break period between pulses appearing on the "PULSE" lead and only a completed first pulse may be sent into the rotary magnet. It will be recalled that this occurs because changeover is controlled by relay E which cannot operate while the vertical interrupters are open. The vertical interrupters close only during break periods. This is an important feature of the invention.

When either the B or the D relay operates, a connection is completed between the ST IN (start in) lead 2 and the ST OUT lead 8 and the A relay is disconnected. At this same time the path to the release magnet M3 is opened and the P lead is connected to the P1 or to the P2 lead, thereby providing a closed transmission path between the calling line circuit and the selector switch (not shown). This transmission path will be held closed by virtue of a locking path maintained by the associated relay until there is a release by the line circuit or by the selector.

Release of the A relay following opening of the break contacts of either the B or D relay causes a transfer of connections to the pulse lead 4 from the rotary magnets to the A relay coil. It also opens the lock and operate paths of the E relay and removes the operate ground from the B and the D relays. At the same time, the A relay opens its own pull path in conjunction with the V.O.N. spring.

Following release of the A relay, the E relay restores and causes the transfer of part of the pulse lead circuit to the vertical magnets and removes the temporary P lead ground. The line circuit will now be connected to the selector and the subscriber will be able to hear dial tone.

When the calling party hangs up his handset, the ground will be removed from the P lead. In response, the B or the D relay will release causing the CO relay (not shown) in the line relay circuit (not shown) to release and to open the transmission leads. At the same time, ground is placed on the release magnet where it remains until the switch is in the normal position.

Construction according to this invention prevents errors such as reseizing of a finder before release, double seizure, and tie up of a hunting element in case "mark" is not found. For example, the finder cannot be reseized until fully released. Full release is not attained until the V.O.N switch is fully reclosed after all other elements of the switch are fully released. Double seizure is prevented by the B and D relays opening their opposite P1 or P2 lead. If two lines, one in each hundred group which have the same vertical and horizontal position demand service simultaneously the faster relay will disconnect the slower relay finding one party and the other will find the next selector. If the finder does not find a mark on its rotary hunt, it will step to the 11 position and the 11 position spring in line 6 will open to release the A relay and return the switch to its normal position.

While the principles of the invention have been described above in connection with specific apparatus and applications, it is to be understood that this description is made only by way of example and not as a limitation on the scope of the invention.

What is claimed is:

1. A linefinder circuit for step-by-step telephone systems comprising:
- means for receiving sequential stepping pulses,
- a vertical magnet for a step-by-step switch,
- means for receiving a demand for service signal, and
- a differential relay responding to the simultaneous receipt of a demand for service signal and a stepping pulse by holding open a set of contacts to prevent connection of the stepping pulse to the vertical magnet.

2. A linefinder circuit as claimed in claim 1, in which said differential relay responds to the continuing presence of a demand for service signal between stepping pulses to close said set of contacts.

3. A linefinder circuit as claimed in claim 2, in which following closure of said set of contacts the stepping pulses are transmitted to the vertical magnet, and
the vertical magnet responds to the stepping pulses to hunt for a marked vertical terminal.

4. A linefinder circuit as claimed in claim 3, including
- a rotary magnet for a step-by-step switch,
- a relay operative in response to location of said marked vertical terminal to open a set of contacts to disconnect the stepping pulses from said vertical magnet and to close a set of contacts to connect said stepping pulses to the rotary magnet.

5. A linefinder circuit as claimed in claim 4, in which the rotary magnet responds to said stepping pulses to cause the step-by-step switch to hunt for a marked horizontal terminal.

6. A linefinder circuit as claimed in claim 5, in which a central pulse generator is provided to supply said sequential stepping pulses, and relay means are provided responsive to location of said marked horizontal terminal to disconnect the rotary magnet from the pulse generator and to connect the marked horizontal terminal to a selector switch.

7. A linefinder circuit as claimed in claim 1, in which a central pulse generator is provided to supply said sequential stepping pulses.

8. A linefinder circuit as claimed in claim 4, in which the vertical magnet includes inhibit means to prevent operation of said relay operative in response to location of said marked vertical terminal, said inhibit means preventing said operation during pulse periods to assure a changeover from vertical to horizontal only during periods between pulses.

References Cited

UNITED STATES PATENTS

| | | |
|---|---|---|
| 2,719,881 | 10/1955 | Dubuar et al. |
| 2,552,773 | 5/1951 | Ffolliott. |

KATHLEEN H. CLAFFY, Primary Examiner

T. W. BROWN, Assistant Examiner